(12) United States Patent
Claus et al.

(10) Patent No.: US 7,353,572 B2
(45) Date of Patent: Apr. 8, 2008

(54) SNAP HOOK

(75) Inventors: Bob Claus, Welland (CA); John Leavitt, Toronto (CA); Tim Accursi, Ancaster (CA)

(73) Assignee: Pensafe, Inc., Stoney Creek, Ontario (CA)

( * ) Notice: Subject to any disclaimer, the term of this patent is extended or adjusted under 35 U.S.C. 154(b) by 86 days.

(21) Appl. No.: 11/237,828

(22) Filed: Sep. 29, 2005

(65) Prior Publication Data

US 2007/0067970 A1 Mar. 29, 2007

(30) Foreign Application Priority Data

Sep. 15, 2005 (CA) .................................. 2519844

(51) Int. Cl.
*F16B 45/02* (2006.01)
(52) U.S. Cl. .................... 24/600.1; 24/599.1; 24/599.9
(58) Field of Classification Search ............... 24/598.2, 24/599.1–600.2; 294/81.5, 81.51, 82.1, 82.17, 294/82.19, 82.2, 82.21, 82.23, 82.31
See application file for complete search history.

(56) References Cited

U.S. PATENT DOCUMENTS

| | | | | | |
|---|---|---|---|---|---|
| 684,419 | A | * | 10/1901 | Farmer | 24/599.2 |
| 2,418,111 | A | * | 4/1947 | Dahlander | 294/82.31 |
| 2,864,644 | A | * | 12/1958 | Marryatt | 294/81.51 |
| 2,987,341 | A | * | 6/1961 | Peck et al. | 294/82.33 |
| 3,317,972 | A | | 5/1967 | Frank | |
| 3,798,716 | A | * | 3/1974 | Klein | 24/599.3 |
| 3,920,265 | A | * | 11/1975 | Nilsson | 297/483 |
| 4,062,092 | A | | 12/1977 | Tamada et al. | |
| 4,122,585 | A | | 10/1978 | Sharp et al. | |
| 5,257,441 | A | | 11/1993 | Barlow | |
| 5,579,564 | A | | 12/1996 | Rullo et al. | |
| 5,895,083 | A | * | 4/1999 | Bidwell | 294/75 |
| 5,896,630 | A | | 4/1999 | Smith et al. | |
| 6,283,523 | B1 | * | 9/2001 | Simond | 294/82.2 |

FOREIGN PATENT DOCUMENTS

| | | |
|---|---|---|
| GB | 174 919 A | 5/1922 |
| GB | 2 106 584 A | 4/1983 |

OTHER PUBLICATIONS

European Search Report with a corresponding European Patent Application.

* cited by examiner

*Primary Examiner*—Robert J. Sandy
*Assistant Examiner*—Ruth C. Rodriguez
(74) *Attorney, Agent, or Firm*—Merek, Blackmon & Voorhees, LLC

(57) ABSTRACT

A snap hook having a hook shank and a gate keeper. The hook shank includes a main body and a hook member. The hook member has a hook bowl and a hook bill with the hook bill and the main body defining a gateway opening therebetween. The gate keeper has an open position and a closed position. When in its closed position the gate keeper encloses the gateway opening and when in its open position the gate keeper allows passage of an object through the gateway opening. The snap hook further includes a first and a second pivot point such that movement of the gate keeper from its closed to its open position requires at least partially rotating the gate keeper about its first pivot point and thereafter at least partially rotating the gate keeper about its second pivot point.

14 Claims, 12 Drawing Sheets

SNAP HOOK

FIELD OF THE INVENTION

This invention relates to snap hooks of the type that may be used on safety belts, safety harnesses, safety lines or any of a wide variety of other applications. In one particular embodiment, the invention relates to a snap hook having a new and improved gate keeper and hook shank design that enhances the ability of the gate keeper to withstand loading in multiple directions and that helps prevent an unintentional opening of the hook.

BACKGROUND OF THE INVENTION

Snap hooks in the safety and lifting industries take a variety of different forms and have an equally wide number of different applications. Such applications include use in fall arrest systems and in the lifting of heavy objects by means of a crane or other lifting devices.

The safe lifting of heavy objects and the prevention of falls is of primary importance on construction sites and in situations where individuals may be working at heights, around areas of excavation, or where a personal fall or the dropping of an object that is being lifted could result in property damage, serious injury or death. Furthermore, in many jurisdictions the employment of a fall arrest system to prevent personal injury is not only desirable, but is a statutory requirement. Commonly fall arrest systems involve the placement of a harness or belt around an individual and then the subsequent use of a rope, cable or strap to secure the harness or belt, and hence the individual, to a solid structure. For example, individuals working on bridges, towers or tall buildings will commonly wear belts or safety harnesses that include a lifeline typically comprised of a rope or strap having its free end secured to the structure upon which they are working. In the logging industry, and in situations where individuals are working on utility poles, a worker is often fitted with a safety belt or harness having a rope or strap that is connected to the belt or harness at one end, is passed around the tree or pole, and that has its free end connected to an opposite side of the belt. At least one end of the rope or strap is usually fitted with a snap hook to enable it to be readily engaged and disengaged from the safety belt or support structure.

In theory, should a worker slip or fall while wearing a safety belt or a harness that is securely attached by way of a lifeline to a solid structure, the worker will only be allowed to fall a short distance after which his decent will be stopped and he will be suspended until he can regain his balance or be rescued. In practice the safety harness and fall arrest systems currently in use do not always function as designed and accidents, injuries and fatalities sometimes occur. One type of failure that can have disastrous results is a failure of the hook used on the end of a lifeline. Similarly, the failure of a hook used in the lifting of heavy objects can be equally dangerous.

Due to their convenience and ease of use, snap hooks having a gate keeper that encloses the hook bowl are probably the most widely used method to secure the end of a lifeline to an object. For the same reasons such hooks are commonly used in a extremely wide variety of other applications, including for the lifting of objects. Unfortunately, simple snap hooks can become unintentionally opened through the application of a force against their gate keeper. As a result, others have proposed and developed a variety of different locking mechanisms that assist in maintaining the gate keeper in a closed position (for example, see U.S. Pat. No. 4,062,092 dated Dec. 13, 1997; U.S. Pat. No. 4,122,585 dated Oct. 31, 1978; U.S. Pat. No. 5,257,441 dated Nov. 2, 1993; U.S. Pat. No. 5,579,564 dated Dec. 3, 1996; and U.S. Pat. No. 5,896,630 dated Apr. 27, 1999.) While such locking mechanisms have reduced the likelihood of an unintentional opening of the hook, they are generally limited in their ability to prevent the gate keeper from becoming dislodged from the end of the hook bowl or bill through the application of forces or loads that may be applied directly to the gate keeper.

For ease of use, many gate keepers require the application of a single force to either the keeper or its lock in order to "open" the hook. In some instances others have designed keeper and lock structures that require the application of two discrete forces to open the hook, one force directed to the lock and one force directed to the keeper. Nevertheless, even in such cases it has been found that situations as innocuous as leaning against a hook that is bearing against a solid surface can be sufficient to cause an accidental disengagement of the gate keeper from the hook's bill. Where that occurs the hook may unintentionally become dislodged and present a significant threat to the safety of personal and equipment.

SUMMARY OF THE INVENTION

The invention therefore provides an improved snap hook that provides an increased level of security and that helps to minimize the likelihood of an accidental or unintentional disengagement of the gate keeper from the hook's bill Accordingly, in one of its aspects the invention provides snap hook comprising a hook shank including a main body and a hook member, said hook member having a hook bowl and a hook bill, said hook bill and said main body defining a gateway opening therebetween; and, a gate keeper having an open position and a closed position, when in said closed position said gate keeper enclosing said gateway opening, when in said open position said gate keeper allowing passage of an object through said gateway opening, said snap hook further including a first and a second pivot point such that movement of said gate keeper from said closed to said open position requires at least partially rotating said gate keeper about said first pivot point and thereafter at least partially rotating said gate keeper about said second pivot point.

In a further aspect the invention provides a snap hook comprising a hook shank having a main body, a hook bowl and a hook bill, said hook bill and said main body defining a gateway opening therebetween; and, a gate keeper rotationally secured to said hook shank and movable from a closed position wherein said gate keeper encloses said gateway opening to an open position wherein said gate keeper allows passage of an object through said gateway opening, said gate keeper movable from said closed position to said open position through sequentially rotating said gate keeper about at least two separate pivot points and through the successive application of a first, a second, a third and a fourth force to said gate keeper, each of said forces applied to said gate keeper at a different angle.

In another aspect the invention provides a snap hook comprising a hook shank including a main body and a hook member, said hook member having a hook bowl and a hook bill, said hook bill and said main body defining a gateway opening therebetween; and, a gate keeper having an open position and a closed position, when in said closed position said gate keeper enclosing said gateway opening, when in said open position said gate keeper allowing passage of an object through said gateway opening, one of said main body and said gate keeper including a pivot pin and the other of said main body and said gate keeper including a slot for receiving said pivot pin, said gate keeper rotationally secured to said hook shank such that movement of said gate keeper from said closed position to said open position requires the application of four successive forces to said gate keeper, said successive forces causing the relative movement of said pivot pin within said slot permitting the controlled rotational movement of said gate keeper relative to said main body.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
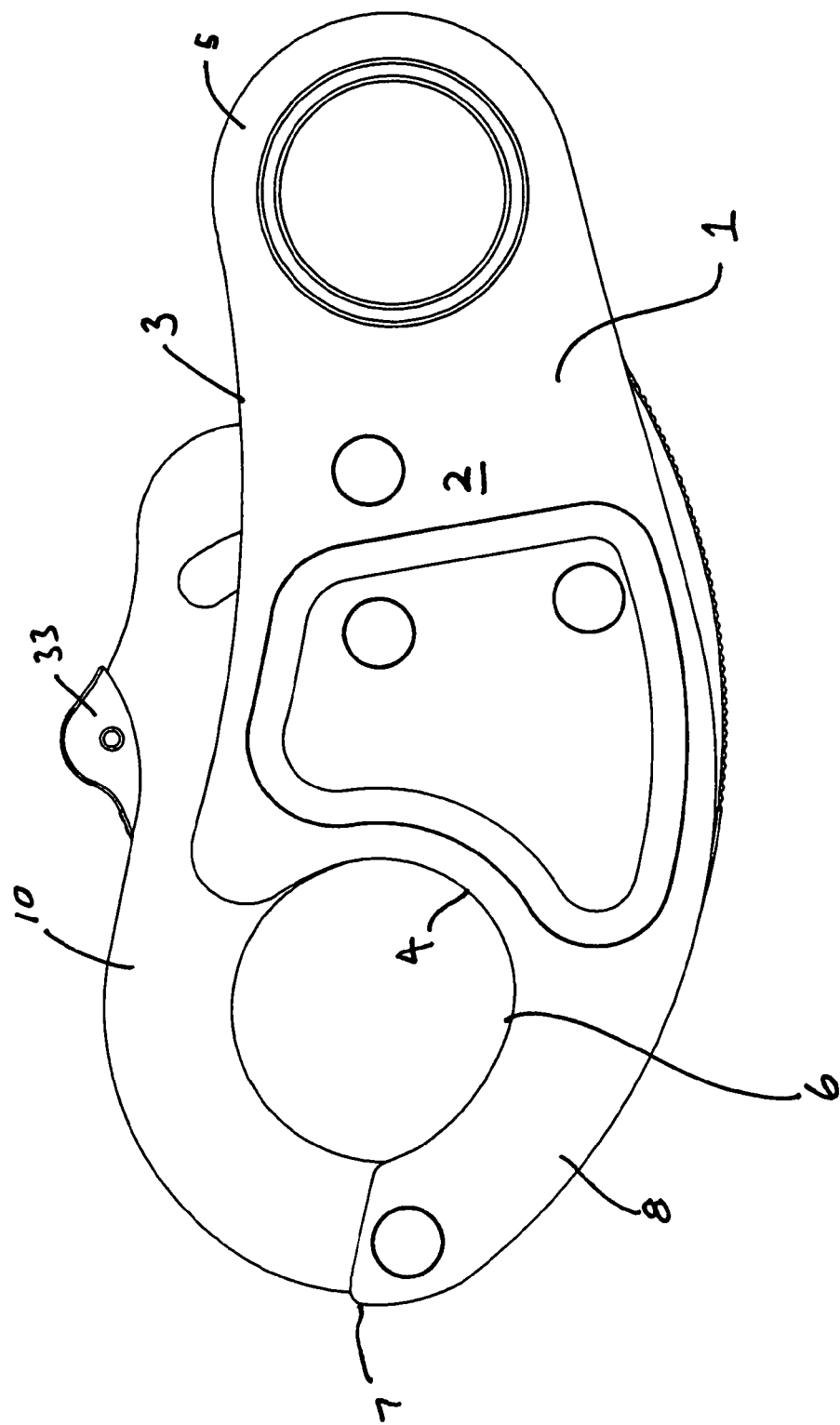
FIG. 1 is a side elevational view of a snap hook constructed in accordance with one of the preferred embodiments of the present invention.
Figure 2:
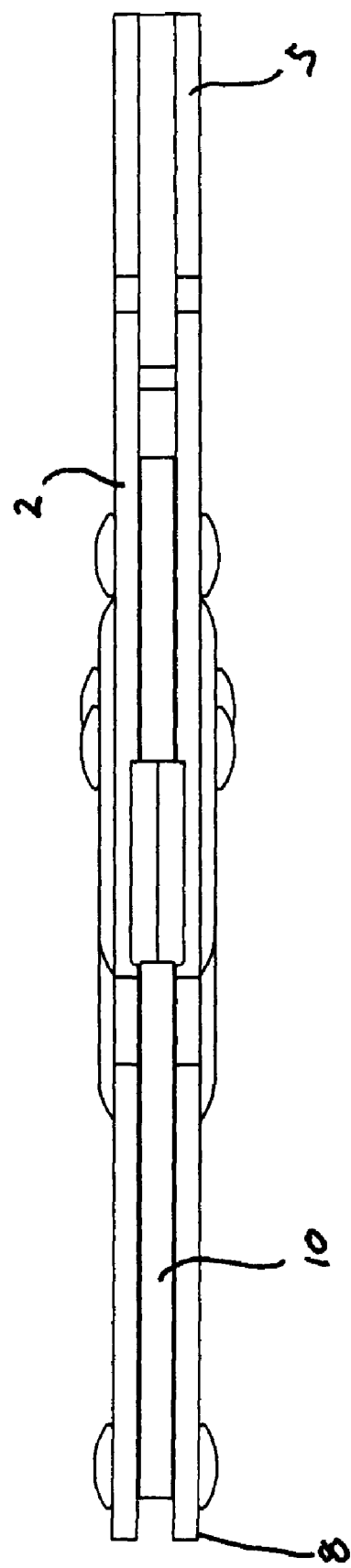
FIG. 2 is a top plan view of the snap hook shown in FIG. 1.
Figure 3:
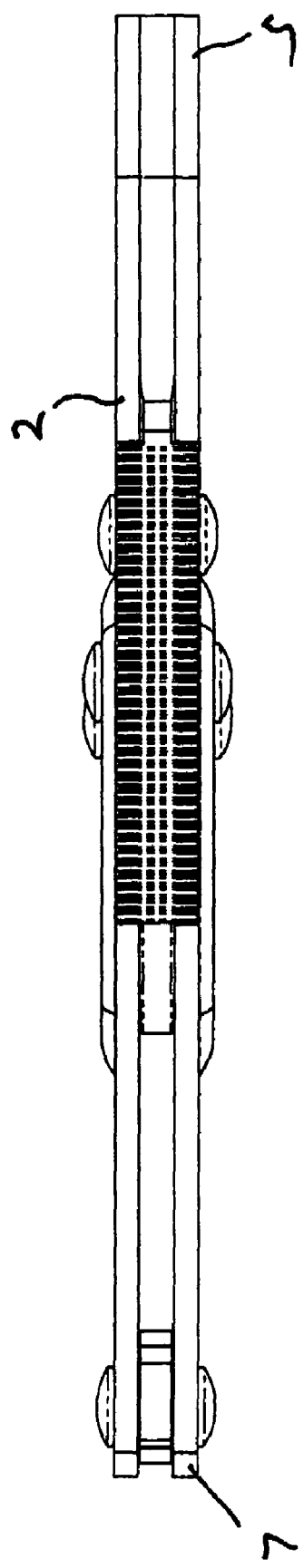
FIG. 3 is a bottom view of the snap hook shown in FIG. 1.
Figure 4:
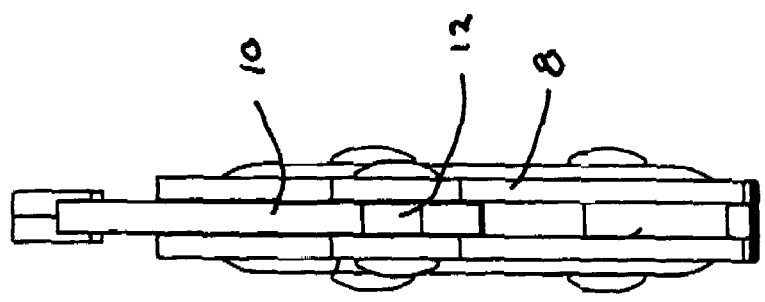
FIG. 4 is a left hand end view of the snap hook shown in FIG. 1.
Figure 5:
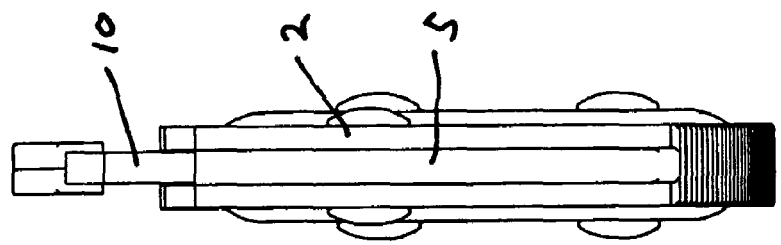
FIG. 5 is a right hand end view of the snap hook shown in FIG. 1.
Figure 6:
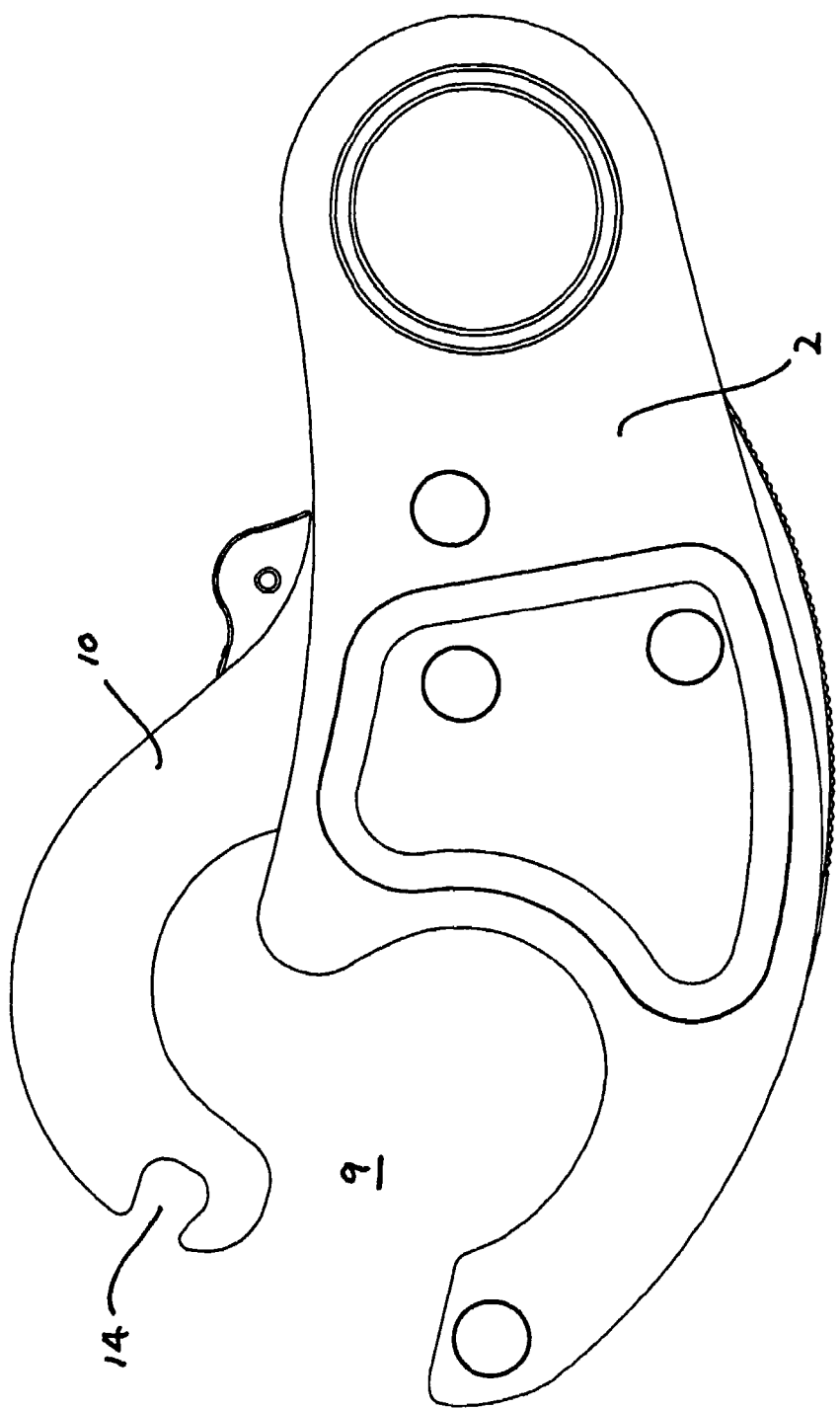
FIG. 6 is a side elevational view of the snap hook shown in FIG. 1 with its gate keeper in an open position.

The present invention may be embodied in a number of different forms. However, the specification and drawings that follow describe and disclose only some of the specific forms of the invention and are not intended to limit the scope of the invention as defined in the claims that follow herein.

A snap hook constructed in accordance with one of the preferred embodiments of the present invention is shown in the attached drawings and represented by reference numeral 1. Snap hook 1 includes a hook shank 2 that is in the form of a main body 3 having a hook member 4 position generally at one of its ends. The opposite end of main body 3 is typically formed with an eye 5 or with a clevis or other means to secure the hook to a rope, cable, belt, chain or other object. In most instances main body 3, hook member 4 and eye 5 will be of unitary construction and formed from a high strength alloy steel or other metal. The structure may also be forged to further increase strength.

In general, hook member 4 has an arched shape and is of a relatively standard configuration for snap hooks. Hook member 4 includes a hook bowl 6 and a free end 7 that defines a hook bill 8. The distance or "opening" between hook bill 8 and main body 3 defines a gateway opening 9 that permits hook bowl 6, and hence hook 1, to be received about a device or object such as an eye bolt, safety cable, lanyard, etc. Hook 1 further includes a gate keeper 10 rotationally secured to said hook shank to enclose gateway opening 9 and to prevent hook 1 from sliding off a cable or other device over which it has been placed. As is traditional with snap hooks, the gate keeper has an open position and a closed position, such that when it is in its closed position the gate keeper extends across the gateway opening and generally encloses the opening to hook bowl 6. When in its open position gate keeper 10 allows passage or entry of an object through gateway opening 9 and into hook bowl 6.

The manner of attachment of gate keeper 10 to hook shank 2 and the operational features of the gate keeper are shown in the cross-sectional views of FIGS. 7 through 11. In the embodiment of the invention shown, gate keeper 10 is generally in the form of a planer or plate-like element, partially received within a slot or hollow interior 11 within shank 2. Depending upon the method of manufacture of hook shank 2, slot 11 may be formed through casing the shank with an internal slot or the slot may be machined into the shank. In the embodiment shown in the attached drawings shank 2 is formed through riveting together a series of plate like structures to form a laminated product with a hollow interior portion that forms slot 11.

Regardless of the means of manufacture of shank 2, it has been found that retaining the gate keeper within slot 11 contributes to the strength and side load capacity of the gate keeper through the formation of a sandwich or laminated type structure. Gate keeper 10 is rotationally secured to shank 2 through the use of one or more pivots or pins such that at least a portion of the gate keeper remains within slot 11 at all times during use of the hook. Accordingly an enhanced side load capability is realized whether the gate keeper is open or closed. While it will be appreciated by those skilled in the art that the pins about which the gate keeper rotates may effectively form part of the shank, or alternately that they may be formed on or otherwise secured to the gate keeper, in the embodiment of the invention shown in the attached drawings the pins or pivot points are in the form of rivets passing through the hook shank. Specifically the drawings show a first pivot point or pin 12 and a second pivot point or pin 13. From a complete understanding of the invention described hereunder it will become apparent that movement of gate keeper 10 from its closed to its open position will require initially at least partially rotating the gate keeper about first pivot point or pin 12 which is located on hook bill 8, and then subsequently at least partially rotating the gate keeper about second pivot point or pin 13 which is positioned on main body 4 of hook shank 2.

In a preferred embodiment of the invention, first pivot point or pin 12 is positioned on hook bill 8 and is in the form of a post or rivet that is at least partially received or held within a receiver 14 formed on the free end 15 of the gate keeper when the gate keeper is in its closed position. The interaction of first pivot point 12 with receiver 14 enhances the load bearing capacity of the gate keeper and helps to prevent free end 15 from being dislodged from the hook bill. Similar to the manner in which hook shank 2 is formed with a slot to partially receive the gate keeper, free end 7 of hook bill 8 is also preferably formed with an internal slot or hollow opening into which the free end or tip 15 of the gate keeper may be received. In this fashion, with the gate keeper in its closed position and first pivot point or pin 12 at least partially received within receiver 14, the ability of the tip of the gate keeper to withstand both side loading and loading directed outwardly from hook bowl 6 will be enhanced.

Second pivot point or pin 13 is preferably secured to either main body 3 or gate keeper 10. The other of the main body and the gate keeper includes a slot 16 for receiving second pivot 13. In the embodiment shown in FIG. 7, second pivot point 13 is secured to main body 3 with slot 16 formed within gate keeper 10. With pivot point 13 received within slot 16 the gate keeper will thus be secured to the hook's main body while still being permitted to move between its open and closed positions by means of rotational movement about the main body. It will, of course, be appreciated the rotational movement of the gate keeper will be to a significant extent controlled by the movement of second pivot 13 within slot 16. It will also be appreciated that while not shown in the attached drawings, the relative positioning of the pivot and slot could be reversed with the pivot situated on the gate keeper and the slot formed within main body 3.

As in the case of many snap hooks, the snap hook of the present invention is normally biased to a configuration where gate keeper 10 is in its closed position. To accomplish this the hook preferably includes at least one return spring 17 tending to bias the gate keeper closed. In the embodiment shown in the attached drawings, return spring 17 has one end fixed to an elongate arm 18 formed upon gate keeper 10 and a second end secured to main body 3 by means of a pin, post or rivet 19. Rotational movement of the gate keeper about second pivot point 13 will thus require the application of a force in excess of the force applied by return spring 17. The use of a pin, post or rivet to secure the return spring to the main body permits the spring to freely rotate within slot 11 of shank 2, as may be necessary during the movement of the gate keeper.

To assist in the controlled movement of the gate keeper, snap hook 1 may further include a guide pin 20 received within a guide channel 21. As in the case of second pivot point 13 and slot 16, the guide pin could be positioned on either main body 3 or gate keeper 10, with guide channel 21 located on the other of the two structures. In the embodiment shown in the attached drawings guide pin 21 is formed on or secured to main body 3 with guide channel 21 formed within gate keeper 10. As will be appreciated from an understanding of the operation of the snap hook, guide pin 20 and guide channel 21 together assist in controlling rotational movement of the gate keeper about second pivot point 13. For ease of assembly, it is expected that in most instances first pivot point 12, second pivot point 13, pin 19 and guide pin 20 will all be comprised of rivets received through the sides of hook shank 2.

The manner in which gate keeper 10 is moved from its closed to its open position will now be described in detail in order to more fully demonstrate the function of the component parts of hook 1. Moving gate keeper 10 from its closed to its open position will require the application of four separate and successive forces to the gate keeper. In these regards reference is first made to FIG. 7 which shows gate keeper 10 in a closed configuration. Here, receiver 14 on the free end 15 of the gate keeper is partially received about first pivot point 12 with return spring 17 biasing the gate keeper in a generally longitudinal direction away from the first pivot point. In this configuration return spring 17 has the effect of driving second pivot point 13 and guide pin 20 into blind ends, 22 and 23 respectfully, of slot 16 and guide channel 21. The dimensions of the gate keeper are preferably such that with second pivot point 13 and guide pin 20 in contact with blind ends 22 and 23, receiver 14 is still at least partially received about first pivot point 12 such that the interaction of the receiver and the first pivot point enhance the load bearing capacity of the gate keeper, as described above.

Figure 8:
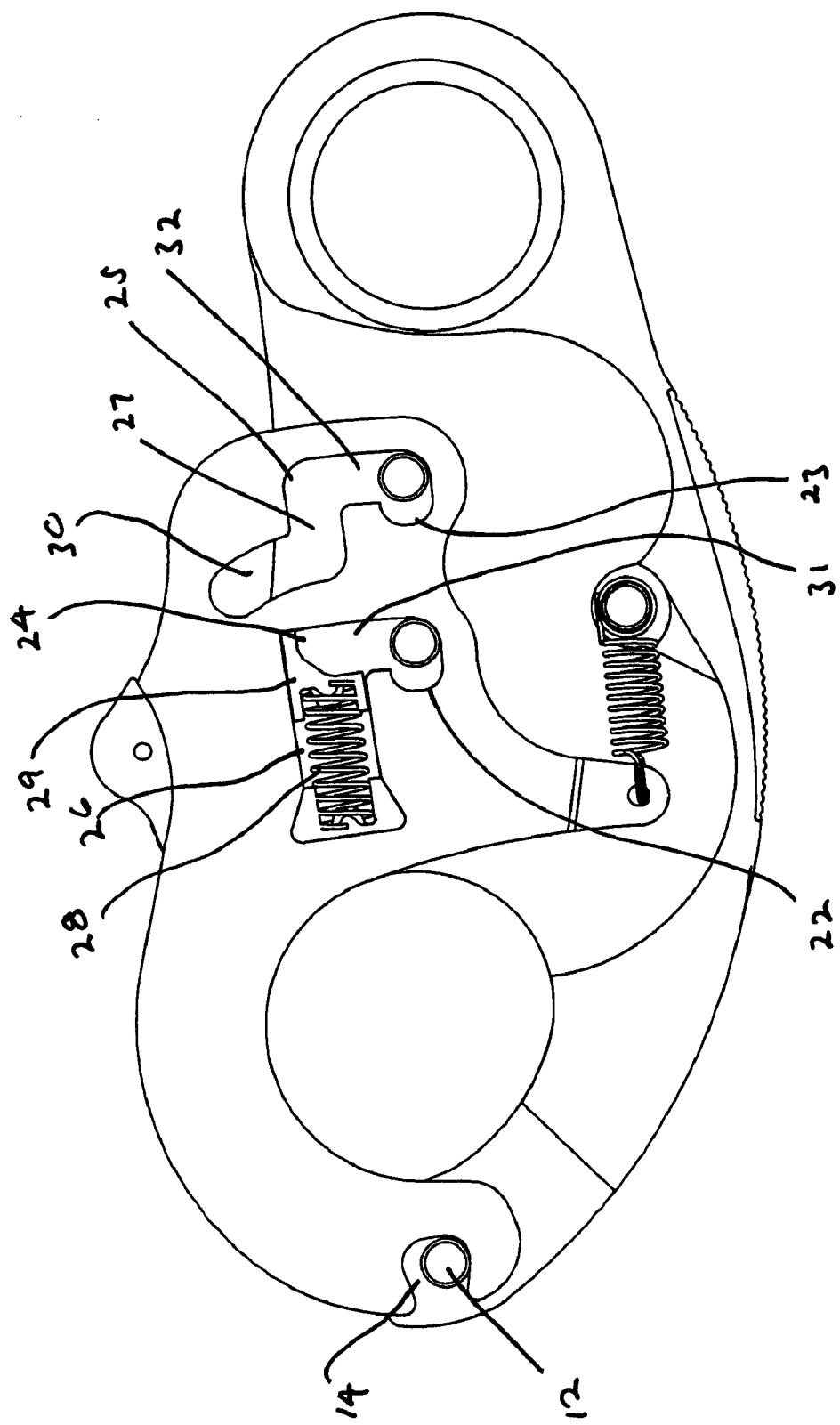
FIG. 8 is a view similar to FIG. 7 wherein the gate keeper is in an initial stage of opening.
Figure 9:
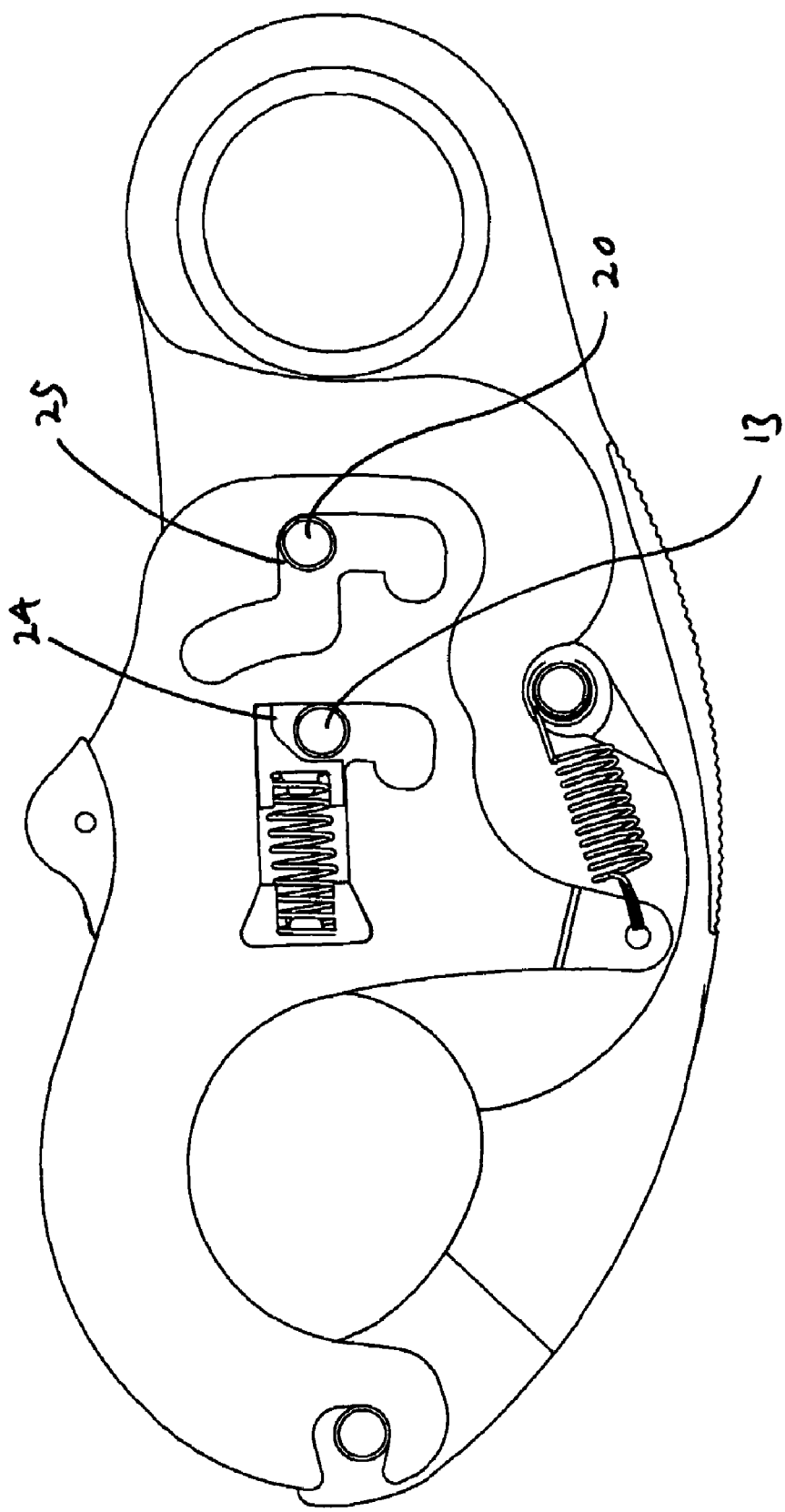
FIG. 9 is a view similar to FIG. 8 wherein the gate keeper is in a further stage of opening.
Figure 9B:
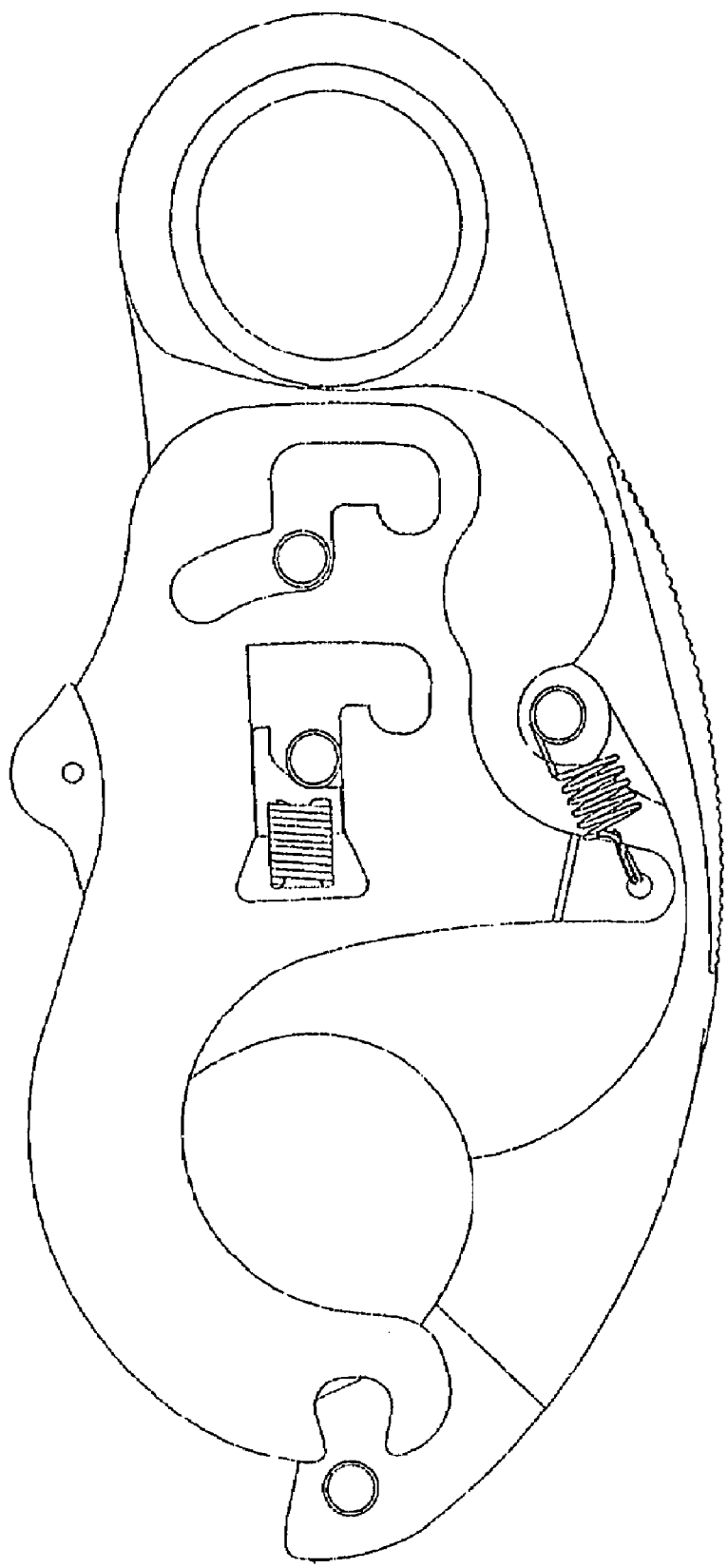
FIG. 9b is a view similar to FIG. 9 wherein the gate keeper is in yet a further stage of opening.

In FIG. 8 snap hook 1 is shown in cross-section where the gate keeper is in an initial stage of being opened. Here a first force has been applied to the gate keeper in a direction generally parallel to the longitudinal axis of the hook's shank and to the gate keeper. When the first force exceeds the biasing force applied by return spring 17 gate keeper 10 will effectively slide in a direction parallel to the longitudinal axis of the hook shank and toward first pivot point 12 until pivot point 12 is seated fully within receiver 14 and second pivot point 13 and guide pin 20 are free from blind ends 22 and 23. At this point the application of a second force to gate keeper 10 in a direction generally perpendicular to the direction of the first force (ie generally perpendicular to the longitudinal axis of hook shank 2) will have the effect of causing the gate keeper to rotate or pivot about first pivot point 12 with second pivot point 13 and guide pin 20 sliding within a transverse leg (31 and 32 respectively) in each of slot 16 and guide channel 21 until second pivot point 13 and guide pin 20 come to rest within corners 24 and 25 of slot 16 and guide channel 21. First pivot point 12 will still be situated within receiver 14 and the hook will be in the stage of opening shown in FIG. 9.

To the continue with the opening of gate keeper 10 a third force is next supplied to the gate keeper in a direction that is generally opposite to the direction of application of the first force. That is, the gate keeper is slid in a downward direction, generally parallel to the longitudinal axis of the hook shank, to effectively pull receiver 14 away from first pivot point 12. This movement will drive second pivot point 13 and guide pin 20 into longitudinally oriented portions 26 and 27 of slot 16 and guide channel 21. As shown in the attached drawings, slot 16 is generally of a "J" shaped configuration and it has received within its longitudinally oriented portion 26 a compression spring 28. Spring 28 will have the effect of limiting movement of second pivot point 13 within longitudinally oriented portion 26 and, as described below, will also assist in returning the gate keeper to its closed position. A spring retainer 29 may be situated between second pivot point 13 and spring 29 in order to help retain the spring in place and to present a surface upon which second pivot point 13 may bear.

Figure 10:
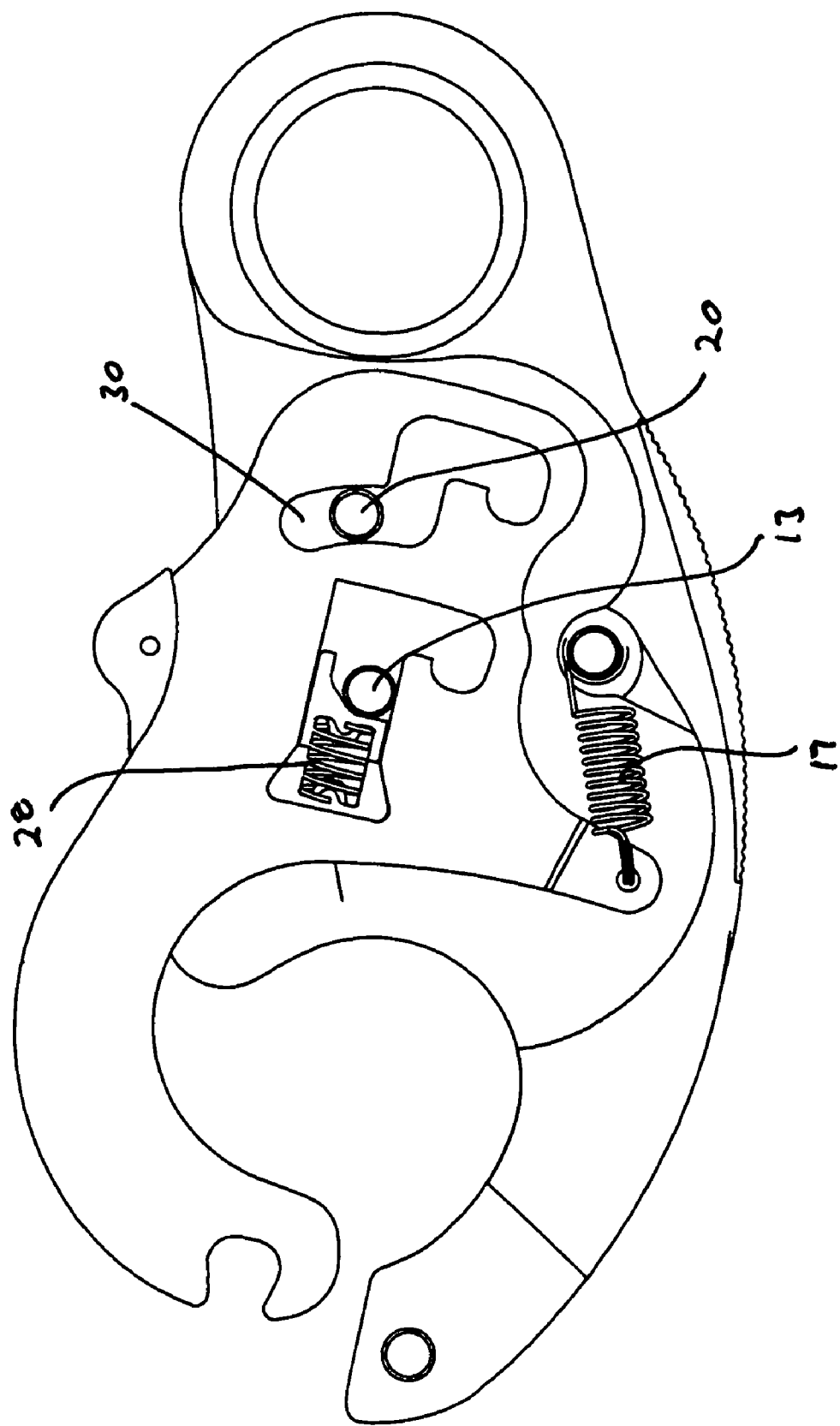
FIG. 10 is a view similar to FIG. 9 wherein the gate keeper is in yet a further stage of opening; and, FIG. 11 is a view similar to FIG. 9 wherein the gate keeper is in a fully open position.
Figure 11:
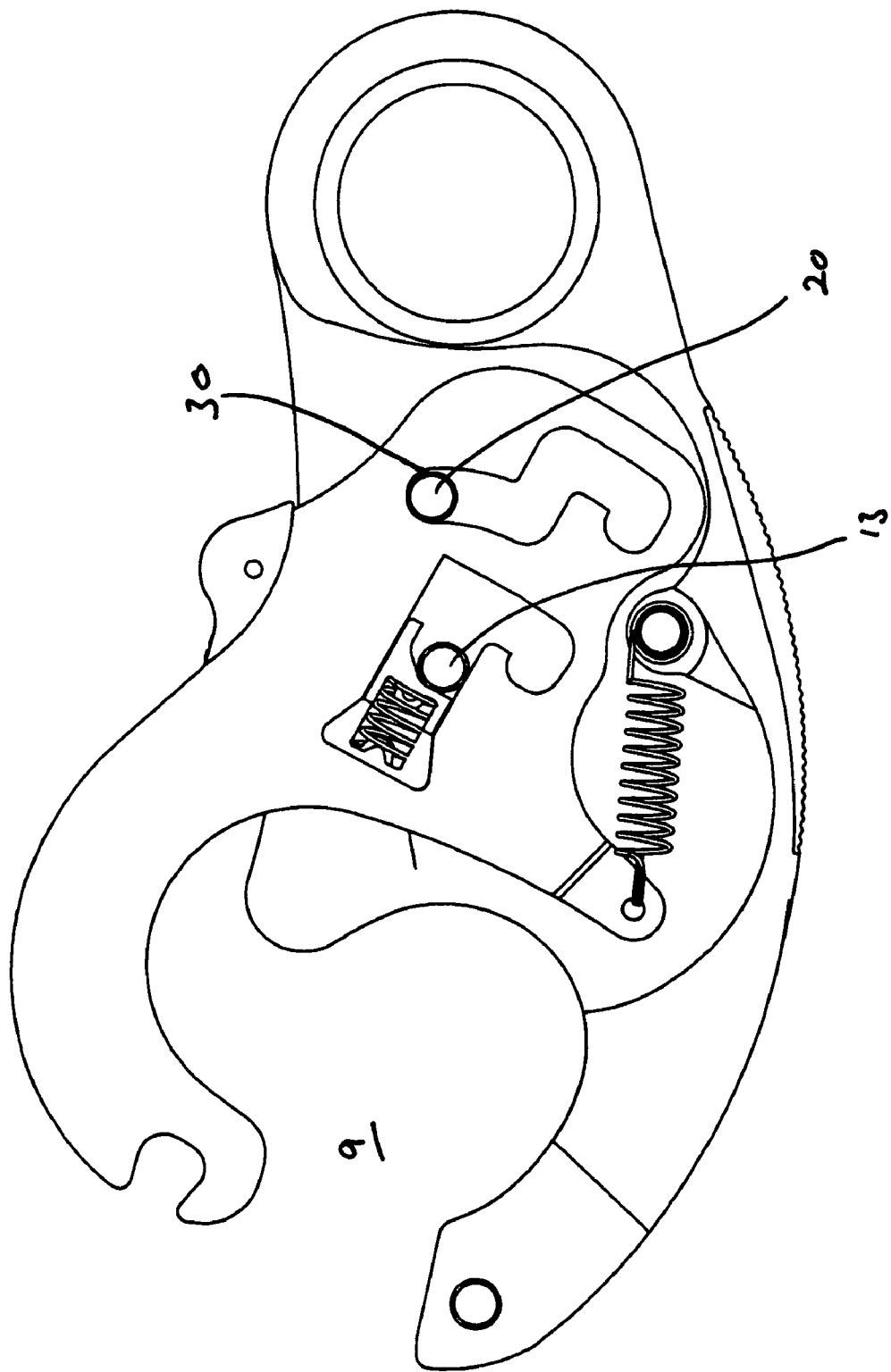

FIGS. 10 and 11 show gate keeper 10 in its final stages of being opened. Following the application of the third downwardly oriented force, the gate keeper will have slid in a downward direction away from first pivot point 12 to a position where receiver 14 is free and clear of the first pivot point to thereby enable the gate keeper to rotate about second pivot point 13 while guide pin 20 travels along an arcuate leg 30 of guide channel 21. Rotation of the gate keeper in this manner requires the application of a fourth force to the keeper. This fourth force is in general a rotational force applied to the exterior face of the keeper. As the fourth force is applied the gate keeper will rotate about second pivot point 13 and guide pin 20 will progressively travel along arcuate leg 30. At the same time, the free end 15 of the gate keeper will be rotated outwardly and away from hook bill 8, effectively "opening" the hook. When guide pin 20 bottoms out against the end of arcuate leg 30 (see FIG. 11) gate keeper 10 will be at that point in a fully open configuration. Movement of the keeper in the above described manner may be facilitated through the incorporation of a thumb rest 33 on the upper exterior surface of the gate keeper.

Figure 7:
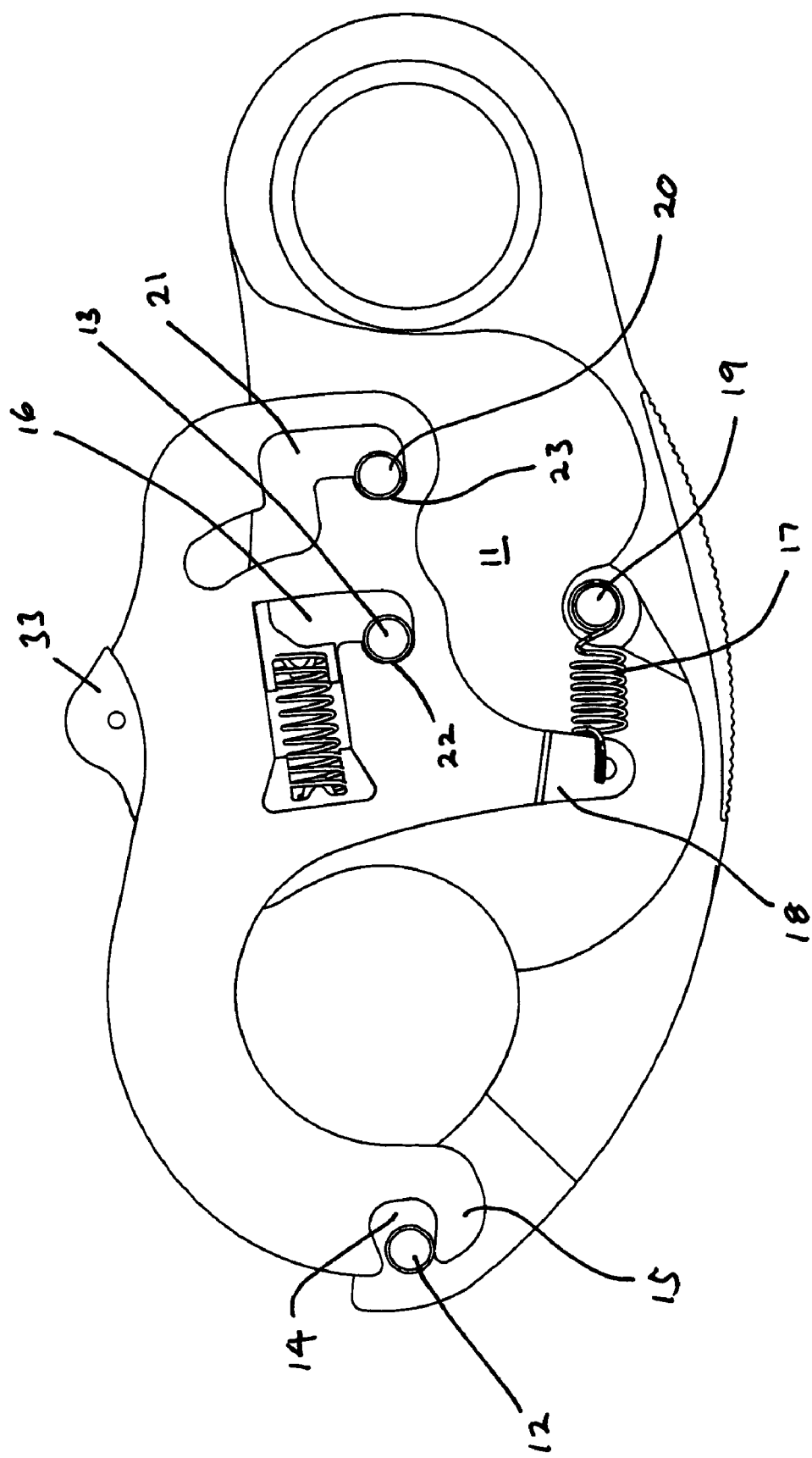
FIG. 7 is a sectional view taken along the line 7-7 in FIG. 2.

Moving the gate keeper to its closed configuration merely requires the release of the gate keeper allowing compression spring 28 and return spring 17 to close to keeper. Once the gate keeper is released return spring 17 will cause the gate keeper to rotate in opposite direction to that as occurs when the keeper is being opened, with the keeper rotating about pivot point 13 and guide pin 20 traveling backwardly along arcuate leg 30. When the guide pin has traversed the entirety of arcuate leg 30 the gate keeper will be forced to move in a longitudinal direction toward first pivot point 12 through the operation of compression spring 28 until receiver 14 is once again received about first pivot point 12. Next, return spring 17 will cause the gate keeper to pivot outwardly away from the hook shank about first pivot point 12 with second pivot point 13 and guide pin 20 traversing legs 31 and 32 of slot 16 and guide channel 21 until they eventually come to rest in blind ends 22 and 23. At this point the gate keeper will be in its closed position, as shown in FIG. 7.

From an understanding of the structure and function of the component parts of snap hook 1, it will be appreciated that a hook structure is provided that exhibits inherent safety previously unavailable in snap hooks. The construction of the hook and its gate keeper greatly enhances the side and vertical loading capabilities of the hook while the movement of the keeper from its closed to its open position requires the application of four separate, distinct and successive forces. Preventing the keeper from becoming opened except in the case of the specific application of four forces in the proper order presents a hook that has an extremely low probability of becoming unintentionally opened during use.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A snap hook comprising:
a hook shank including a main body and a hook member, said hook member having a hook bowl and a hook bill, said hook bill and said main body defining a gateway opening therebetween; and,
a gate keeper having an open position and a closed position, when in said closed position said gate keeper enclosing said gateway opening, when in said open position said gate keeper allowing passage of an object through said gateway opening,
said snap hook further including a first and a second pivot point such that movement of said gate keeper from said closed to said open position requires the application of four separate and successive forces applied to said gate keeper, and at least partially rotating said gate keeper about said first pivot point and thereafter at least partially rotating said gate keeper about said second pivot point through the application of said four separate and successive forces,
said main body also including a guide pin received within a guide channel in said gate keeper, said guide pin and said guide channel together assisting in controlling the rotational movement of said gate keeper about said second pivot point.

2. The snap hook as claimed in claim 1 wherein said first pivot point is positioned on said hook bill and said second pivot point is positioned on said main body.

3. The snap hook as claimed in claim 1 wherein said hook includes at least one return spring, said return spring biasing said gate keeper to said closed position.

4. The snap hook as claimed in claim 1 wherein said gate keeper includes a free end having formed thereon a receiver, said first pivot point at least partially received within said receiver when said gate keeper is in said closed position.

5. A snap hook comprising:
a hook shank having a main body, a hook bowl and a hook bill, said hook bill and said main body defining a gateway opening therebetween; and,
a gate keeper rotationally secured to said hook shank and movable from a closed position wherein said gate keeper encloses said gateway opening to an open position wherein said gate keeper allows passage of an object through said gateway opening, said gate keeper movable from said closed position to said open position through sequentially rotating said gate keeper about at least two separate pivot points and through the successive application of a first force, a second force, a third force and a fourth force to said gate keeper, each of said forces applied to said gate keeper at a different angles,
said snap hook further including a guide pin received within a guide channel, said guide pin and said guide channel together assisting in controlling the movement of said gate keeper between said closed and said open positions upon the application of said first, second, third and fourth forces to said gate keeper.

6. The snap hook as claimed in claim 5 wherein said first force is applied to said gate keeper in a direction generally parallel to said hook shank.

7. The snap hook as claimed in claim 6 wherein said second force is applied to said gate keeper in a direction generally perpendicular to the direction of application of said first force.

8. The snap hook as claimed in claim 7 wherein said third force is applied to said gate keeper in a direction generally opposite to the direction of application of said first force.

9. The snap hook as claimed in claim 8 wherein said fourth force is a rotational force applied to said gate keeper causing said gate keeper to rotate about said hook shank.

10. A snap hook comprising:
a hook shank including a main body and a hook member, said hook member having a hook bowl and a hook bill, said hook bill and said main body defining a gateway opening therebetween; and,
a gate keeper having an open position and a closed position, when in said closed position said gate keeper enclosing said gateway opening, when in said open position said gate keeper allowing passage of an object through said gateway opening,
one of said main body and said gate keeper including a guide pin and the other of said main body and said gate keeper including a guide channel for receiving said guide pin, said gate keeper rotationally secured to said hook shank such that movement of said gate keeper from said closed position to said open position requires the application of four successive forces to said gate keeper, said successive forces causing the relative movement of said guide pin within said guide channel permitting the controlled rotational movement of said gate keeper relative to said main body.

11. The snap hook as claimed in claim 10 wherein said guide pin is fixed to said hook shank and said guide channel is formed in said gate keeper.

12. The snap hook as claimed in claim 11 including a spring biasing said gate keeper to said closed position.

13. The snap hook as claimed in claim 12 wherein said guide channel is generally J shaped.

14. The snap hook as claimed in claim 11 including a pivot pin positioned on said hook bill, said gate keeper including a free end having a receiver thereon, said pivot pin at least partially received within said receiver when said gate keeper is in said closed position.

* * * * *